(12) United States Patent
Bachon et al.

(10) Patent No.: US 7,057,001 B2
(45) Date of Patent: Jun. 6, 2006

(54) POLYMERS WITH UREA GROUPS AND SILYL GROUPS AND PRODUCTION AND USE THEREOF

(75) Inventors: Thomas Bachon, Duesseldorf (DE); Wilfried Huebner, Langenfeld (DE); Hermann Kluth, Duesseldorf (DE); Wolfgang Klauck, Meerbusch (DE); Johann Klein, Duesseldorf (DE)

(73) Assignee: Henkel Kommanditgesellschaft auf Aktien (Henkel KGAA), Duesseldorf (DE)

( * ) Notice: Subject to any disclaimer, the term of this patent is extended or adjusted under 35 U.S.C. 154(b) by 0 days.

(21) Appl. No.: 10/415,185

(22) PCT Filed: Oct. 24, 2001

(86) PCT No.: PCT/EP01/12291

§ 371 (c)(1),
(2), (4) Date: Apr. 25, 2003

(87) PCT Pub. No.: WO02/34838

PCT Pub. Date: May 2, 2002

(65) Prior Publication Data

US 2005/0260401 A1 Nov. 24, 2005

(30) Foreign Application Priority Data

Oct. 27, 2000 (DE) .............................. 100 53 545

(51) Int. Cl.
*C08G 18/61* (2006.01)
(52) U.S. Cl. ..................... 528/29; 528/73; 528/368; 528/369; 525/474; 544/222
(58) Field of Classification Search ............... 528/29, 528/73, 368, 369; 525/474; 544/222
See application file for complete search history.

(56) References Cited

U.S. PATENT DOCUMENTS

| 3,632,557 | A | * | 1/1972 | Brode et al. .................. 528/28 |
| 3,671,562 | A | * | 6/1972 | Pepe et al. .................. 556/421 |
| 4,124,545 | A | | 11/1978 | Hocker et al. |
| 4,412,073 | A | | 10/1983 | Robin |
| 5,218,133 | A | | 6/1993 | Pepe et al. |
| 5,260,436 | A | | 11/1993 | Verkade et al. |
| 5,423,735 | A | | 6/1995 | Callinan et al. |
| 5,837,796 | A | | 11/1998 | Scholl et al. |
| 5,886,205 | A | | 3/1999 | Uchida et al. |
| 6,008,396 | A | | 12/1999 | Sheridan et al. |
| 6,281,322 | B1 | * | 8/2001 | Groth et al. .................. 528/28 |
| 6,451,930 | B1 | * | 9/2002 | Burgman et al. ........... 525/452 |

FOREIGN PATENT DOCUMENTS

| CA | 1 335 673 | 5/1995 |
| EP | 0 348 620 A2 | 1/1990 |
| EP | 1 006 132 A1 | 6/2000 |
| JP | 93-185595 | 7/1993 |
| WO | WO 01/68782 A2 | 9/2001 |

OTHER PUBLICATIONS

Database WPI, Derwent Publications Ltd., London, GB AN 1979-27304b, XP002186568 relating to SU 606 863 (May 3, 1978).

Laas et al., "Synthese von Isocyanuratpolyisocyanaten", Journal for praktische Chemie, vol. 336, pp. 192-196 (1994).

* cited by examiner

*Primary Examiner*—Rachel Gorr
(74) *Attorney, Agent, or Firm*—Woodcock Washburn LLP

(57) ABSTRACT

A process for the production of compounds which contain at least one urea group and at least one silyl group. The process involves reacting a compound containing at least one amino group and a carbamate compound. The compounds produced by this process are useful as surface coating compositions, foams and adhesives.

12 Claims, No Drawings

POLYMERS WITH UREA GROUPS AND SILYL GROUPS AND PRODUCTION AND USE THEREOF

CROSS REFERENCE TO RELATED APPLICATIONS

This application is a national stage application under 35 USC 371 of international application PCT/EP01/12291 filed on Oct. 24, 2001, the international application not being published in English. This application also claims priority under 35 USC 119 to DE 100 53 545.3, filed on Oct. 27, 2000.

BACKGROUND OF THE INVENTION

This invention relates to a process for the production of compounds containing at least one urea group and at least one silyl group, in which a compound containing at least one amino group is reacted with a carbamate, either the compound with at least one amino group or the carbamate bearing a silyl group, to compounds produced by this process, to their use and to surface coating compositions, foams and adhesives containing these compounds.

Organic compounds, especially polymers, which contain both a silyl group and a urea group are used in many branches of industry, for example in the coating or adhesives field. The advantages of such compounds, especially the polymers, lie in particular in their ability both to hydrophobicize and to impart a binding effect to hydrophilic substrates and also to crosslink with one another under the effect of moisture.

Surface coating compositions containing the above-mentioned compounds show improved adhesion both on hydrophobic and on hydrophilic surfaces. Adhesives containing such polymers are capable, for example, of permanently bonding both hydrophilic and hydrophobic substrates and substrates of different polarity to one another.

Hitherto, the simultaneous introduction of urea groups and silyl groups into polymers has been difficult for a variety of reasons. In many cases, isocyanatosilanes have been used to introduce such groups even though they were unpopular among manufacturers of such products because of their toxicity and their sensitivity to water. In addition, residues of isocyanatosilanes often could not be removed to a satisfactory level from the compounds thus produced so that a residual content of isocyanates often resulted in an obligation to declare the compounds themselves or products produced from them. However, the declaration of such ingredients reduces consumer acceptance of the products produced from them.

However, the problem illustrated here with reference by way of example to the interplay between urea groups and silyl groups also applies in principle to many other methods of introducing structural elements obtainable using isocyanate groups into polymers. The presence of isocyanates in reaction mixtures often leads to the formation of unwanted products or to isocyanate-containing material remaining in the end product so that the problems mentioned above arise.

A process for the production of polyethers containing both a urea group and an alkoxysilyl group is described, for example, in Chemical Abstracts 123:171406 (abstract of JP 93-185 595). To produce these compounds, an aminofunctional polyether is reacted with a silyl compound containing as isocyanate group.

U.S. Pat. No. 5,886,205 relates to a process for the production of isocyanate compounds containing silyl groups which comprises the thermal decomposition of carbamic acid esters containing silyl groups in the presence of a catalyst. The reaction of a carbamate with a compound containing at least one amino group is not mentioned in this document.

U.S. Pat. No. 5,218,133 relates to a process for the production of silyl carbamates or silyl isocyanurates, in which an aminosilane is reacted with a dialkyl carbonate, diaryl carbonates or a mixture thereof in the presence of a basic catalyst to give a silyl organocarbamate. The basic catalyst is then optionally neutralized and residual aminosilane is neutralized. After addition of a decomposition catalyst and heating under reduced pressure, a silyl isocyanurate is obtained. However, the cited document does not describe how silyl compounds containing urea structural elements can be obtained by reaction of carbamates with amino compounds, either the amino compound or the carbamate or both containing a silyl group.

U.S. Pat. No. 6,008,396 describes a process for the production of an isocyanato-organsosilane, in which a carbamato-organosilane is converted into an isocyanato-organosilane in an inert liquid medium. The production of compounds containing both a urea group and a silyl group is not mentioned in the cited document.

U.S. Pat. No. 5,886,205 describes a process for the production of an isocyanate containing silyl groups in which a carbamic acid ester containing silyl groups is decomposed in the presence of a catalyst at a pH value of at most 8. A process for the production of compounds containing both urea groups and silyl groups is not described in the cited document.

In addition, many combinations of structural elements obtainable using isocyanate groups and silyl groups have hitherto only been obtainable by multistage and hence expensive processes. This applies in particular to the production of polymers containing both isocyanurate groups and urea and silyl groups. Such polymers are of considerable interest with regard in particular to their crosslinking and hence to the resulting material properties of surface coating compositions and adhesives.

EP-A 1 006 132 relates to alkoxysilane-containing lacquer preparations produced using 4,4'-diisocyanatodicyclohexyl methane polyisocyanates. The cited document describes, for example, the reaction of polyisocyanates obtainable by trimerization of 4,4'-diisocyanatodicyclohexyl methane with aminofunctional alkoxysilanes. Unfortunately, the described reaction has the disadvantage that isocyanurates generally containing low molecular weight diisocyanates are used. Low molecular weight isocyanates such as these have a considerable toxic potential. In addition, the crosslinking of a polymer produced using such isocyanurates is difficult to control because the isocyanurates described in the cited document always represent a complex mixture of compounds differing in their functionality in which isocyanurates having a functionality of more than three are always present. The use of such mixtures involves the disadvantage for the user that the properties of a polymer produced using these triisocyanatotriisocyanurate mixtures are difficult to adjust in view of slight crosslinking. Another disadvantage of the compounds described in the cited document is that a urea group or a urethane group is always present in the immediate vicinity of the isocyanurate group because of the structure of the isocyanurates used. This constellation complicates or prevents the production of highly flexible binders because this direct proximity of the functional groups mentioned generally leads to hard brittle binders.

In addition, the presence of urethane groups reduces the thermal stability of these compounds because urethane groups split at ca. 140–160° C. Unfortunately, such behavior prevents the use of such compounds in heat-resistant applications.

Another disadvantage of the described compounds is that isocyanurates containing isocyanate groups are difficult to produce. On account of the danger of crosslinking, which increases with increasing conversion, the trimerization of isocyanates to isocyanurates can only be carried out to a certain degree below a corresponding crosslinking point. The isocyanate originally used for crosslinking and the isocyanurate containing isocyanate groups obtained as product then have to be separated in complicated distillation processes. After distillation, the isocyanate distilled off is returned to the trimerization process. The volume/time yields of such a process are poor on account of the complex separation steps.

SUMMARY OF THE INVENTION

Accordingly, there was a need for a process that would lead to polymers containing both at least one urea group and a silyl group in which the disadvantages mentioned above would be avoided. In addition, there was a need for polymers containing isocyanurate groups, urea groups and silyl groups which would not attended by any of the disadvantages mentioned above.

The problem addressed by the present invention is solved by a process for the production of compounds containing at least one urea group and at least one silyl group, by compounds produced by this process, by polymers containing at least one isocyanurate group and at least one silyl group, by processes for the production of such polymers and by the use of the compounds produced by the process according to the invention and the compounds according to the invention in surface coating compositions, foams or adhesives.

DETAILED DESCRIPTION OF THE INVENTION

Accordingly, the present invention relates firstly to a process for the production of compounds containing at least one urea group and at least one silyl group, in which a compound containing at least one amino group and a carbamate are reacted as reactants, at least one of the reactants carrying a silyl group.

A "urea group" in the context of the present invention is understood to be a structural element corresponding to general formula I:

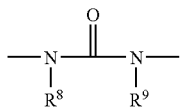

(I)

in which $R^8$ is hydrogen and $R^9$ is hydrogen, a linear or branched alkyl group containing 1 to 24 carbon atoms, an optionally substituted aryl group containing 6 to 24 carbon atoms, an alkyl or arylsilyl group. The substituent $R^9$ may also contain one or more substituents, such as ester groups, keto groups, amino groups or hydroxyl groups. The substituent $R^9$ is preferably hydrogen or a linear or branched alkyl group containing 1 to 12 carbon atoms, more particularly hydrogen.

A "silyl group" in the context of the present invention is understood to be a compound corresponding to general formula II:

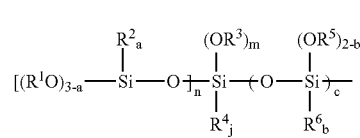

(II)

in which $R^1$ to $R^6$ independently of one another represent a linear or branched, saturated or unsaturated hydrocarbon radical containing 1 to about 24 carbon atoms, a saturated or unsaturated cycloalkyl group containing 4 to about 24 carbon atoms or an aryl group containing 6 to about 24 carbon atoms, n, m and j are each integers of 0 to 3 (m+n+j=3), a is an integer of 0 to 3, b is an integer of 0 to 2 and c is a number of 0 to 8.

In a first embodiment of the present invention, a compound containing a silyl group corresponding to general formula II is used as at least one reactant. Suitable compounds are in particular compounds corresponding to general formula III:

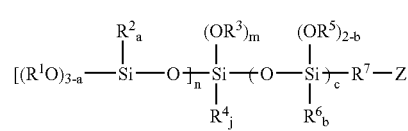

(III)

in which $R^1$ to $R^6$, a, b, c, n, m and j are as defined above, $R^7$ is an optionally substituted alkylene group containing 1 to about 44 carbon atoms, an optionally substituted cycloalkylene group containing 6 to about 24 carbon atoms or an optionally substituted arylene group containing 6 to about 24 carbon atoms and Z is an amino group or a carbamate group. Suitable substituents are, for example, functional groups, such as thioether, mercapto, amino, ester, amido, nitro or ether groups or mixtures of two or more thereof.

A "carbamate group" in the context of the present invention is understood to be a structural element corresponding to general formula IV:

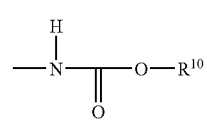

(IV)

in which the substituent $R^{10}$ is a linear or branched, saturated or unsaturated alkyl group containing 1 to about 10 carbon atoms, a saturated or unsaturated cycloalkyl group containing about 6 to about 24 carbon atoms or an aryl group containing 6 to about 24 carbon atoms.

In a preferred embodiment of the present invention, compounds corresponding to general formula II, in which Z is an amino group, are used as at least one reactant. Compounds such as these are also referred in the present specification as aminosilanes.

Suitable aminosilanes are, for example, N-(α-methyldimethoxysilylmethyl)-amine, N-α-trimethoxysilylmethyl)-amine, N-α-diethylmethoxy-silylmethyl)-amine, N-(α-ethyldimethoxysilylmethyl)-amine, N-α-methyldiethoxysilylmethyl)-amine, N-(α-triethoxysilylmethyl)-amine, N-α-ethyldiethoxysilylmethyl)-amine, N-(β-methyldimethoxysilylethyl)-amine, N-(β-trimethoxysilylethyl)-amine, N-(β-ethyldimethoxysilylethyl)-amine, N-(β-methyldiethoxysilylethyl)-amine, N-(β-triethoxysilylethyl)-amine, N-(β-ethyldiethoxysilylethyl)-amine, N-(γ-methyldimethoxysilylpropyl)-amine, N-(γ-trimethoxysilylpropyl)-amine, N-(γ-ethyldimethoxysilylpropyl)-amine, N-(γ-methyldiethoxysilylpropyl)-amine, N-(γ-triethoxysilylpropyl)-amine, N-(γ-ethyldiethoxysilylpropyl)-amine, N-(4-methyldimethoxysilylbutyl)-amine, N-(4-trimethoxysilylbutyl)-amine, N-(4-triethylsilylbutyl)-amine, N-(4-diethylmethoxysilylbutyl)-amine, N-(4-ethyldimethoxysilylbutyl)-amine, N-(4-methyldiethoxysilylbutyl)-amine, N-(4-triethoxysilylbutyl)-amine, N-(4-diethylethoxysilylbutyl)-amine, N-(4-ethyldiethoxysilylbutyl)-amine, N-(5-methyldimethoxysilylpentyl)-amine, N-(5-trimethoxysilylpentyl)-amine, N-(5-triethylsilylpentyl)-amine, N-(5-ethyldimethoxysilylpentyl)-amine, N-(5-methyldiethoxysilylpentyl)-amine, N-(5-triethoxysilylpentyl)-amine, N-(5-diethylethoxysilylpentyl)-amine, N-(5-ethyldiethoxysilylpentyl)-amine, N-(6-methyldimethoxysilylhexyl)-amine, N-(6-trimethoxysilylhexyl)-amine, N-(6-ethyldimethoxysilylhexyl)-amine, N-(6-methyldiethoxysilylhexyl)-amine, N-(6-triethoxysilylhexyl)-amine, N-(6-ethyldiethoxysilylhexyl)-amine, N-[γ-tris-(trimethoxysiloxy)silylpropyl]-amine, N-[γ-tris(trimethoxysiloxy)silylpropyl]-amine, N-(γ-trimethoxysiloxydimethylsilylpropyl)-amine, N-(γ-trimethylsiloxydimethoxysilylpropyl)-amine, N-(γ-triethoxysiloxydiethylpropyl)-amine, N-(γ-triethoxysiloxydiethoxysilylpropyl)-amine, N,N-butyl-(γ-trimethoxy-silylpropyl)-amine, N,N-butyl-(γ-triethoxysilylpropyl)-amine, N,N-phenyl-(γ-trimethoxysilylpropyl)-amine, N,N-phenyl-(γ-triethoxysilylpropyl)-amine, N,N-cyclohexyl-(γ-trimethoxysilyipropyl)-amine, N,N-ethyl-(γ-trimethoxysilyl-propyl)-amine, diethyl-N-(trimethoxysilylpropyl)-aspartate, diethyl-N-(triethoxysilylpropyl)-aspartate, N,N-ethyl-(γ-dimethoxymethylsilylpropyl)-amine, N,N-ethyl-(γ-trimethoxysilylisobutyl)-amine, N,N-Bis-(trimethoxypropyl)-amine, N,N-ethyl-(γ-trimethoxysilylisobutyl)-amine, N,N-ethyl-(α-trimethoxysilylmethyl)-amine, dibutyl-N-(trimethoxysilylpropyl)-aspartate, dibutyl-N-(triethoxysilylpropyl)-aspartat, N,N-(β-aminopropyl)-(γ-trimethoxy-silylpropyl)-amine, N,N'-di-(trimethoxysilylpropyl)-ethylenediamine, tetra-(trimethoxysilylpropyl)-ethylendiamine and N,N-ethyl-(β-trimethoxysilyl-ethyl)-amine or N-[γ-tris(trimethylsiloxy)silylpropyl]-amine or mixtures of two or more thereof.

In addition, aminosilanes corresponding to general formula III in which the recurring unit characterized by the parameter c is a recurring unit corresponding to general formula V:

where c has a value of 1 to about 6, may also be used in accordance with the invention.

Carbamatosilanes corresponding to general formula III in which Z is a carbamate group corresponding to general formula IV are also suitable for use as reactants in accordance with the invention.

Carbamatosilanes corresponding to general formula III can be obtained, for example, by reaction of an aminosilane with a dialkyl or diaryl carbonate or pyrocarbonate or a mixture of two or more thereof. Such a reaction is normally carried out in the presence of a basic catalyst. Basically, however, any other known processes for the production of carbamates may also be used providing they are suitable for the production of carbamatosilanes, for example the reaction of aminosilanes with chloroformic acid esters or the reaction of isocyanatosilanes with alcohols.

Suitable carbonates are, for example, dimethyl carbonate, diethyl carbonate, dipropyl carbonate, dibutyl carbonate, diisobutyl carbonate, di-tert.butyl carbonate, diisopentyl carbonate, diisopropyl carbonate, ethylmethyl carbonate, ethyl-2-butoxyethyl carbonate, bis-(2-chloroethyl)-carbonate, diphenyl carbonate, bis-(o,m-chlorophenyl)-carbonate, bis-(o,p-chlorophenyl)-carbonate, bis-(dichlorophenyl)-carbonate, bis-(trichloro-phenyl)-carbonate or bis-(o-,m-,p-tolyl)-carbonate or mixtures of two or more thereof.

Carbamatosilanes produced using dimethyl carbonate, diethyl carbonate or dipropyl carbonate or pyrocarbonate or mixtures of two or more thereof are preferably used in accordance with the invention.

Suitable dialkyl pyrocarbonates are, for example, dimethyl pyrocarbonate, diethyl pyrocarbonate or di-tert.butyl pyrocarbonate. The reaction between the aminosilane and the organic carbonate may be carried out, for example, using stoichiometric quantities of the reactants. However, it is also possible, and often preferable, to use an excess of organic carbonate of about 0.05 to about 1 mol per mol aminosilane. Good results can be obtained, for example with a carbonate excess of about 0.1 to about 0.4 mol per mol aminosilane. In the case of relatively high molecular weight silanes, for example with a molecular weight of more than about 200 or more than about 500, or in the case of aminosilanes with a sterically hindered amino group, it may be necessary to use an even larger excess of carbonate.

The reaction between aminosilane and carbonate is normally catalyzed by a basic catalyst. A strongly basic catalyst is preferably used. Suitable basic catalysts are, for example, the alkali metal alkoxides obtainable by reaction of monohydric alcohols with alkali metals. Suitable alkali metals are, for example, lithium, sodium or potassium; suitable monohydric alcohols are, for example, methanol, ethanol, propanol or butanol. Suitable strongly basic catalysts are, in particular, sodium methanolate, sodium ethanolate, sodium propanolate, sodium tert.butanolate, potassium methanolate, potassium ethanolate, potassium propanolate or potassium tert.butanolate and the like.

The quantity of catalyst during the reaction is about 0.01 to about 2% by weight, based on carbonate and aminosilane used.

The reaction between aminosilane and organic carbonate is slightly exothermic. Normally, the aminosilane and organic carbonate are reacted with one another in the presence of the basic catalyst in such a way that the reaction temperature remains in the range from about 10 to about 120° C., for example in the range from about 20 to about 80° C. or in the range from about 25 to about 60° C. The stability of the temperature within these ranges may be achieved, for example, by typical cooling processes, such as cold water, ice bath, dry ice bath or by controlling the rate at which the reactants are added. The reaction is normally carried out at ambient pressure in an inert gas atmosphere.

On completion of the reaction, catalyst remaining in the reaction mixture and excess aminosilane are neutralized by addition of a neutralizing agent. Suitable neutralizing agents are, for example, inorganic acids, such as water-free hydrochloric acid, water-free phosphoric acid, or organic acids, such as glacial acetic acid, propionic acid, butyric acid, hexanoic acid, oleic acid, maleic acid, fumaric acid, succinic acid and the like. Weak organic acids, such as glacial acetic acid, or inorganic acids, such as water-free phosphoric acids, for example superphosphoric acid or polyphosphoric acid, or—where they exist—anhydrides thereof are preferably used for neutralization. It is particularly suitable to use anhydrides of the corresponding acids because both the catalyst and excess amine are bound. The reaction product may be separated off by typical known methods. The separation of precipitated salts by filtration, for example through silica gel or a suitable filter paper, and subsequent removal of volatile components by reduced pressure or an increase in temperature or both is particularly suitable.

Particularly suitable carbamatosilanes corresponding to general formula III are, for example, methyl-N-α-methyldimethoxysilylmethyl)-carbamate, methyl-N-(α-trimethoxysilylmethyl)-carbamate, methyl-N-(α-ethyldimethoxysilylmethyl)-carbamate, methyl-N-(α-methyldiethoxysilyl-methyl)-carbamate, methyl-N-(α-triethoxysilylmethyl)-carbamate, methyl-N-(β-methyldimethoxysilylethyl)-carbamate, methyl-N-(β-trimethoxysilylethyl)-carbamate, methyl-N-(β-diethylmethoxysilylethyl)-carbamate, methyl-N-(β-ethyldimethoxysilylethyl)-carbamate, methyl-N-(β-methyldiethoxysilylethyl)-carbamate, methyl-N-(β-triethoxysilylethyl)-carbamate, methyl-N-(β-ethyldiethoxysilylethyl)-carbamate, methyl-N-(γ-methyldimethoxysilylpropyl)-carbamate, methyl-N-(γ-trimethoxysilylpropyl)-carbamate, methyl-N-(γ-ethyldimethoxysilylpropyl)-carbamate, methyl-N-(γ-methyldiethoxysilyl-propyl)-carbamate, methyl-N-(γ-triethoxysilylpropyl)-carbamate, methyl-N-(γ-ethyldiethoxysilylpropyl)-carbamate, methyl-N-(4-trimethoxysilylbutyl)-carbamate, methyl-N-(4-ethyldimethoxysilylbutyl)-carbamate, methyl-N-(4-methyldiethoxysilylbutyl)-carbamate, methyl-N-(4-triethoxysilylbutyl)-carbamate, methyl-N-(4-ethyldiethoxysilylbutyl)-carbamate, methyl-N-(5-methyldimethoxysilylpentyl)-carbamate, methyl-N-(5-trimethoxysilylpentyl)-carbamate, methyl-N-(5-ethyldimethoxysilylpentyl)-carbamate, methyl-N-(5-methyldiethoxysilylpentyl)-carbamate, methyl-N-(5-triethoxysilylpentyl)-carbamate, methyl-N-(5-ethyldiethoxysilylpentyl)-carbamate, methyl-N-(6-trimethoxysilylhexyl)-carbamate, methyl-N-(6-ethyldimethoxysilylhexyl)-carbamate, methyl-N-(6-triethoxysilylhexyl)-carbamate, methyl-N-(6-ethyldiethoxysilylhexyl)-carbamate, methyl-N-[γ-tris-(trimethoxysiloxy)-silylpropyl]-carbamate, ethyl-N-(α-methyldimethoxysilylmethyl)-carbamate, ethyl-N-(α-trimethoxysilylmethyl)-carbamate, ethyl-N-(α-methyldiethoxysilylmethyl)-carbamate, ethyl-N-α-triethoxysilylmethyl)-carbamate, ethyl-N-α-ethyldiethoxysilylmethyl)-carbamate, ethyl-N-(β-methyldimethoxysilylethyl)-carbamate, ethyl-N-(β-trimethoxysilylethyl)-carbamate, ethyl-N-(β-ethyldimethoxysilylethyl)-carbamate, ethyl-N-(β-dimethylethoxysilylethyl)-carbamate, ethyl-N-(D-methyldiethoxysilylethyl)-carbamate, ethyl-N-(β-triethoxysilylethyl)-carbamate, ethyl-N-(γ-trimethoxysilylpropyl)-carbamate, ethyl-N-(γ-ethyldimethoxysilylpropyl)-carbamate, ethyl-N-(γ-methyldiethoxysilylpropyl)-carbamate, ethyl-N-(γ-triethoxysilylpropyl)-carbamate, ethyl-N-(γ-ethyldiethoxysilylpropyl)-carbamate, ethyl-N-(4-trimethoxysilylbutyl)-carbamate, ethyl-N-(4-ethyldimethoxysilylbutyl)-carbamate, ethyl-N-(4-methyldiethoxysilylbutyl)-carbamate, ethyl-N-(4-triethoxysilylbutyl)-carbamate, ethyl-N-(4-ethyldiethoxysilylbutyl)-carbamate, ethyl-N-(5-methyldimethoxysilylpentyl)-carbamate, ethyl-N-(5-trimethoxysilylpentyl)-carbamate, ethyl-N-(5-ethyldimethoxysilylpentyl)-carbamate, ethyl-N-(5-triethoxysilylpentyl)-carbamate, ethyl-N-(5-ethyldiethoxysilylpentyl)-carbamate, ethyl-N-(6-methyldimethoxysilylhexyl)-carbamate, ethyl-N-(6-trimethoxysilylhexyl)-carbamate, ethyl-N-(6-ethyldimethoxysilylhexyl)-carbamate, ethyl-N-(6-methyldiethoxysilylhexyl)-carbamate, ethyl-N-(6-triethoxysilylhexyl)-carbamate, ethyl-N-[γ-tris-(trimethoxysiloxy)silylpropyl]-carbamate, methyl-N-[γ-tris(trimethoxysiloxy)silylpropyl]-carbamate, methyl-N-(γ-trimethoxysiloxydimethylsilylpropyl)-carbamate, methyl-N-(γ-trimethylsiloxydimethoxysilylpropyl)-carbamate, methyl-N-[γ-tris(triethoxysiloxy)silylpropyl]-carbamate, methyl-N-(γ-triethoxysiloxydiethylpropyl)-carbamate, methyl-N-(γ-triethoxysiloxydiethoxysilylpropyl)-carbamate, methyl-N-[γ-tris(trimethylsiloxy)silylpropyl]carbamate and methyl-N-[6-tris(triethoxysiloxy)silylhexyl]-carbamate. Ethyl-N-[γ-tris(trimethoxysiloxy)silyl-propyl]-carbamate, ethyl-N-(γ-trimethoxysiloxydimethylsilylpropyl) carbamate, ethyl-N-(γ-trimethylsiloxydimethoxysilylpropyl)-carbamate, ethyl-N-[γ-tris(triethoxysiloxy)silylpropyl]-carbamate, ethyl-N-(γ-triethoxysiloxydiethylpropyl)-carbamate, ethyl-N-(γ-triethoxysiloxydiethoxysilylpropyl)-carbamate, ethyl-N-[γ-tris(trimethylsiloxy)silylpropyl]-carbamate and ethyl-N-[6-tris-(triethoxysiloxy)silylhexyl]-carbamate.

In the process according to the invention, a compound containing at least one amino group and a compound containing at least one carbamate group, at least one of the compounds carrying a silyl group, are reacted with one another. In the illustrated variants, i.e. where Z is an amino group or Z is a carbamate group, the above-mentioned compounds of general formula III satisfy the corresponding requirements. Accordingly, it is possible by the process according to the invention to produce compounds which contain one urea group and two silyl groups by reacting two compounds corresponding to general formula III with one another, one of the compounds mentioned containing an amino group and one a carbamate group. However, it is also possible in accordance with the invention for one of the reactants not to contain a silyl group.

Suitable reactants have, for example, a structure corresponding to general formula VI:

where Z is as already defined, p is a rational number of 1 to about 1,000 and $R^{11}$ is a linear or branched, saturated or unsaturated, optionally substituted alkyl group containing 2 to about 44 carbon atoms, a saturated or unsaturated, optionally substituted cycloalkyl group containing 6 to about 44 carbon atoms, an optionally substituted aryl group containing 6 to about 44 carbon atoms, an isocyanurate ring or a polymer with a molecular weight of at least about 150.

In another embodiment of the present invention, a compound corresponding to general formula VI, in which Z is an amino group, is used as at least one reactant in the process according to the invention. If, in a compound corresponding to general formula VI, Z is an amino group, at least one other reactant corresponding to general formula III, in which Z is a carbamate group, must be present in the reaction mixture.

If a compound corresponding to general formula VI, in which Z is an amino group, is used in the process according to the invention, the substituent $R^{11}$ may be, for example, a linear or branched, saturated or unsaturated, optionally substituted alkyl group containing 1 to about 44 carbon atoms. Suitable alkyl groups have a length of, for example, 3 to about 20 carbon atoms. If the alkyl group is unsubstituted, the compounds corresponding to general formula VI are monoalkylamines. Suitable monoalkylamines are, for example, ethylamine, propylamine, butylamine, pentylamine, hexylamine and linear or branched higher homologs thereof containing up to about 100 carbon atoms, the amino group being positioned either terminally or anywhere within the alkyl group.

According to the invention, the substituent $R^{11}$ may also be a substituted alkyl group. Suitable substituents are, for example, hydroxyl groups, ester groups, carboxylic acid groups, sulfonic acid groups, phosphonic acid groups and the corresponding esters of the acid groups mentioned.

In another embodiment of the present invention, the substituent $R^{11}$ has two or more groups Z, i.e. p is a number of 2 or more.

Accordingly, in another embodiment of the present invention, the reaction mixture may contain, for example, a compound VI with two or more amino groups as a reactant. Suitable such compounds are, for example, ethylenediamine, propylenediamine, butylenediamine, hexamethylenediamine, 2,4,4-trimethyl hexamethylenediamine, diethylenetriamine, 1,12-diaminododecane, diamines derived from dimer fatty acids or triamines derived from trimer fatty acids or a mixture of two or more of the compounds mentioned.

In another embodiment of the present invention, $R^{11}$ may be a saturated or unsaturated, optionally substituted cycloalkyl group containing 6 to about 24 carbon atoms. A corresponding cycloalkyl group may carry the substituents already mentioned above as substituents. In particular, the cycloalkyl group may contain one or more other amino groups. Suitable cycloalkyl compounds are, for example, cyclohexylamine, dicyclohexylamine, 1,4-cyclohexyldiamine, 4,4'-dicyclohexylmethanediamine, isophoronediamine, 1,3-bis-(aminomethyl)-cyclohexane, 1,4-bis(aminomethyl)-cyclohexane and hydrogenated toluenediamines, such as 1-methyl-2,4,-diaminocyclohexane, 1-methyl-2,6-diaminocyclohexane and the like.

In another embodiment of the present invention, the compounds of general formula VI used may be amines in which the substituent $R^{11}$ represents optionally substituted aryl groups containing 6 to about 24 carbon atoms. Suitable substituents are in particular the substituents already mentioned in the foregoing. Particularly suitable aryl compounds corresponding to general formula VI are, for example, aniline, 1,4-diaminobenzene, aminotoluene, m- or p-phenylenediamine, diaminobiphenyl, p-methoxyaniline, p-chloroaniline, o-, m- or p-toluidine, 2,4-xylidine, 2,4- and 2,6-toluenediamine and corresponding mixtures, 4,4'-diphenylenediamine, methylene-bis-(anilines) including 4,4'-methylenebis-(aniline), 2,4'-methylene-bis-(aniline), 4,4'-oxy-bis-(aniline), 4,4'-carbonyl-bis-(aniline), 4,4'-sulfonyl-bis-(aniline) or naphthyldiamines or mixtures of two or more of the compounds mentioned.

In another embodiment of the present invention, the compounds of general formula VI used may be amines in which the substituent $R^{11}$ represents optionally substituted isocyanurates. Particularly suitable compounds are 1,3,5-trisaminoalkyl, cycloalkyl and aryl isocyanurates. The following are mentioned as examples: 1,3,5-tris-(6-aminohexyl)-isocyanurate, 1,3,5-tris(6-aminopropy)-isocyanurate, 1,3,5-tris(6-aminoethyl)-isocyanurate, 1,3,5-tris-(3-aminophenyl)-isocyanurate and 1,3,5-tris-(4-methyl-3-aminophenyl)-isocyanurate. Mixtures of two or more of the compounds mentioned may also be used.

Another embodiment of the present invention is characterized by the use of compounds corresponding to general formula VI in which $R^{11}$ stands for one of the groups mentioned above which contains at least one carbamate group as the functional group Z. Compounds such as these may be obtained by reaction of the above-mentioned amino compounds with organic carbonates or pyrocarbonates as already described in the present specification. Suitable compounds are, for example, compounds which contain only one carbamate group. However, compounds containing two or more carbamate groups may also be used in the process according to the invention. If a compound containing one or more carbamate groups is used as the compound of general formula VI in accordance with the invention, at least one compound of general formula III where Z is an amino group must be used as a further reactant in the process according to the invention.

In addition, compounds of general formula VI containing both an amino group and a carbamate group may also be used in accordance with the invention. Such compounds may be obtained, for example, by reaction of compounds of the type described above containing more than one amino compound with organic carbonates in a corresponding stoichiometric ratio, for example in a molar ratio of 1:1 or less.

In another embodiment of the present invention, the substituent $R^{11}$ in formula VI is a polymer.

In a preferred embodiment of the present invention, the polymer used is a polymer selected from the group consisting of polyacrylates, polymethacrylates, polystyrenes, polyesters, polyethers, polyamides, polyurethanes, polycarbonates, polylactones, polyethylenimine, polyureas, polyolefins and polyoxazolidones.

A "polymer" in the context of the present invention is understood to be a compound with a molecular weight of at least about 150 but preferably higher, for example at least about 500, 800 or at least about 1,000.

The polymers suitable for use as compounds of general formula VI in accordance with the invention may contain, for example, only one functional group Z. However, it is equally possible, and preferred in accordance with the invention, for the number of functional groups Z to be more than 1, for example at least about 2, 3, 4, 5 or more.

According to the invention, the number p in general formula VI is a rational number of 1 to about 1,000. The number p of functional groups Z in a polymer corresponding to general formula VI may then assume a value differing from an integer if the number of functional groups Z is taken as an average value in a mixture of molecules of general formula VI, the number of functional groups per molecule varying, as frequently encountered in polymer chemistry. Such variations can arise, for example, due to the functionalization of a polymer in a polymer-analog reaction.

In a preferred embodiment of the present invention, the number p has a value of about 1.5 to about 10, more particularly a value of about 1.8 to about 5 and most particularly a value of about 1.9 to about 3.

In the context of the process according to the invention, a functional group Z may be positioned terminally or laterally of the polymer chain $R^{11}$. If the number of functional groups Z is more than 1, two or more functional groups may be positioned both exclusively terminally and also exclusively laterally or terminally and laterally of a polymer chain.

According to the invention, suitable polymers $R^{11}$ are, for example, polymers obtainable by polymerization of compounds containing at least one olefinically unsaturated double bond. Suitable polymers are, for example, polyacrylates, polymethacrylates, polyvinyl esters, polyvinyl ethers, polyolefins or polystyrenes.

The molecular weight ($M_n$) of polymers suitable as $R^{11}$ is preferably in the range from about 300 to about 1,000,000, more preferably in the range from about 500 to about 300,000 and most preferably in the range from about 1,000 to about 30,000.

The molecular weight distribution of the polymers, which can be determined, for example, by gel permeation chromatography, based on polystyrene as standard, under measuring conditions typically applied for polymers, need not be monomodal. A suitable polymer may also have a bimodal or higher distribution.

The terms "polyacrylate" or "polyacrylates" used in the present specification apply in the following both to polymers or copolymers of acrylic acid and/or derivatives thereof and to polymers or copolymers of methacrylic acid and/or derivatives thereof, unless otherwise indicated in the text.

Polyacrylates can be produced by subjecting acrylic acid and/or methacrylic acid and/or derivatives of acrylic acid and/or methacrylic acid, for example esters thereof with mono- or polyhydric alcohols, either individually or in the form of mixtures of two or more thereof, to polymerization in known manner, for example to radical, ionic or metal-catalyzed polymerization.

According to the invention, both homo- and copolymers may be used as polyacrylates. Besides the corresponding acrylates or methacrylates, suitable copolymers may also contain, for example, styrene, acrylonitrile, vinyl acetate, vinyl propionate, vinyl chloride, vinylidene chloride and/or butadiene.

Suitable monomers for the production of the polyacrylates are, in particular, methyl acrylate, ethyl acrylate, n-butyl acrylate, isobutyl acrylate, tert.butyl acrylate, hexyl acrylate, 2-ethylhexyl acrylate or lauryl acrylate and the corresponding esters of methacrylic acid. Acrylic acid, methacrylic acid, acrylamide or methacrylamide may also be added in small quantities as further monomers during the polymerization.

Other acrylates and/or methacrylates containing one or more functional groups may optionally be present during the polymerization. These are, for example, maleic acid, itaconic acid, butanediol diacrylate, hexanediol diacrylate, triethylene glycol diacrylate, tetraethylene glycol diacrylate, neopentyl glycol diacrylate, trimethylol propane triacrylate, 2-hydroxyethyl methacrylate, hydroxypropyl acrylate or propylene glycol methacrylate.

The corresponding functional groups Z may be introduced into the polymer, for example, using correspondingly functionalized monomers containing amino groups which are incorporated in the monomers forming $R^{11}$ in a copolymerization reaction. However, the polymers may also be provided with functional groups Z after polymerization in a suitable polymer-analog reaction. Corresponding reactions are known to the expert.

Monomers suitable for introducing amino groups into the polymers are, for example, 2-aminoethyl acrylamide, 2-aminoethyl methacrylamide, 3-aminopropylacrylamide, 3-aminopropyl methacrylamide and allylamine.

The polymers containing amino groups as functional groups Z may then be converted in a polymer-analog reaction into compounds corresponding to general formula VI which contain a carbamate group as the functional group Z. A corresponding polymer-analog reaction, for example with organic carbonates, may be carried out by the scheme already described in the foregoing.

If the corresponding polymer contains more than one amino group, the conversion of amino groups into carbamate groups may be carried out completely or only partly.

In addition, polyesters may be used as the polymers $R^{11}$ in accordance with the invention. Suitable polyesters may be obtained in known manner by polycondensation of acid and alcohol components, more particularly by polycondensation of a polycarboxylic acid or a mixture of two or more polycarboxylic acids and a polyol or a mixture of two or more polyols.

Polycarboxylic acids suitable in accordance with the present invention for the production of the polyester usable as $R^{11}$ may be based on an aliphatic, cycloaliphatic, araliphatic, aromatic or heterocyclic parent compound and, besides the at least two carboxylic acid groups, may optionally contain one or more substituents which do not react in a polycondensation reaction, for example halogen atoms or olefinically unsaturated double bonds. The free carboxylic acids may even be replaced by their anhydrides (where they exist) or esters with $C_{1-5}$ monoalcohols or mixtures of two or more thereof for the polycondensation reaction.

Suitable polycarboxylic acids are, for example, succinic acid, adipic acid, suberic acid, azelaic acid, sebacic acid, glutaric acid, glutaric anhydride, phthalic acid, isophthalic acid, terephthalic acid, trimellitic acid, phthalic anhydride, tetrahydrophthalic anhydride, hexahydrophthalic anhydride, tetrachlorophthalic anhydride, endomethylene tetrahydrophthalic anhydride, glutaric anhydride, maleic acid, maleic anhydride, fumaric acid, dimer fatty acids or trimer fatty acids or mixtures of two or more of the polycarboxylic acids mentioned. Small quantities of monofunctional fatty acids may optionally be present in the reaction mixture.

Various polyols may be used as the diols for producing a polyester or polycarbonate usable as $R^{11}$ in a compound corresponding to general formula VI. Examples of such polyols are aliphatic polyols containing 2 to 4 OH groups per molecule. These OH groups may be both primary and secondary OH groups. Suitable aliphatic polyols include, for example, ethylene glycol, propane-1,2-diol, propane-1,3-diol, butane-1,4-diol, butane-1,3-diol, butane-2,3-diol, butene-1,4-diol, butine-1,4-diol, pentane-1,5-diol, and the isomeric pentanediols, pentenediols or pentinediols or mixtures of two or more thereof, hexane-1,6-diol and the isomeric hexanediols, hexenediols or hexinediols or mixtures of two or more thereof, heptane-1,7-diol and the isomeric heptane, heptene or heptinediols, octane-1,8-diol and the isomeric octane, octene or octinediols and higher homologs or isomers of the compounds mentioned, which are obtained in known manner from a step-by-step extension of the hydrocarbon chain by one $CH_2$ group at a time or by introducing branches into the carbon chain, or mixtures of two or more thereof.

Other suitable polyols are alcohols of relatively high functionality, such as glycerol, trimethylol propane, pentaerythritol or sugar alcohols, such as sorbitol or glucose, and oligomeric ethers of the substances mentioned either as such or in the form of a mixture of two or more of the compounds mentioned with one another, for example polyglycerol with a degree of polymerization of about 2 to about 4. In the alcohols of relatively high functionality, one or more OH groups may be esterified with monobasic carboxylic acids containing 1 to about 20 carbon atoms, with the proviso that, on average, at least two OH groups remain intact. The alcohols mentioned with a functionality of more than 2 may be used in pure form or, where possible, in the form of the technical mixtures obtainable in the course of their synthesis.

The reaction products of low molecular weight polyfunctional alcohols with alkylene oxides, so-called polyether polyols, may also be used as polyol component for the production of the polyesters. Polyether polyols, which are to be used for the production of polyesters suitable as $R^{11}$, are preferably obtained by reaction of polyols with alkylene oxides. The alkylene oxides preferably contain 2 to about 4 carbon atoms. Suitable polyether polyols are, for example, the reaction products of ethylene glycol, propylene glycol, the isomeric butanediols or hexanediols, as mentioned above, or mixtures of two or more thereof with ethylene oxide, propylene oxide or butylene oxide or mixtures of two or more thereof. Other suitable polyether polyols are products of the reaction of polyhydric alcohols, such as glycerol, trimethylol ethane or trimethylol propane, pentaerythritol or sugar alcohols or mixtures of two or more thereof with the alkylene oxide mentioned to form polyether polyols. Polyether polyols with a molecular weight ($M_n$) of about 100 to about 3,000 and preferably in the range from about 200 to about 2,000 obtainable from the reactions mentioned are particularly suitable. The polyether polyols mentioned may be reacted with the polycarboxylic acids mentioned above in a polycondensation reaction to form the polyesters suitable for use as the polymers $R^{11}$.

The functionalization of the polymers $R^{11}$ with corresponding functional groups Z may be carried out in known manner. Polyesters containing a carboxylic acid group as terminal group are particularly suitable for functionalization. Polyesters such as these may be reacted with polyamines, for example, in a polymer-analog reaction so that the polyester contains terminal amino groups. If the polyester is provided with amino groups in a polymer-analog reaction, it would also be possible, for example, to use polyesters containing terminal carboxylic acid groups or lateral and terminal amino groups which are subsequently functionalized with polyamines to form aminofunctional polyesters.

The polyesters containing amino groups as functional groups Z may then be converted in a polymer-analog reaction into compounds corresponding to general formula VI which contain a carbamate group as the functional group Z. A corresponding polymer-analog reaction, for example with organic carbonates, may be carried out to the scheme already described in the foregoing.

Polyether polyols are also suitable for as the polymers $R^{11}$. Suitable polyether polyols are normally obtained by reacting a starting compound containing at least two reactive hydrogen atoms with alkylene or arylene oxides, for example ethylene oxide, propylene oxide, butylene oxide, styrene oxide, tetrahydrofuran or epichlorohydrin or mixtures of two or more thereof.

Suitable starting compounds are, for example, water, ethylene glycol, 1,2- or 1,3-propylene glycol, 1,4- or 1,3-butylene glycol, 1,6-hexanediol, 1,8-octanediol, neopentyl glycol, 1,4-hydroxymethyl cyclohexane, 2-methylpropane-1,3-diol, glycerol, trimethylol propane, hexane-1,2,6-triol, butane-1,2,4-triol, trimethylol ethane, pentaerythritol, mannitol, sorbitol, methyl glycosides, sugars, phenol, isononyl phenol, resorcinol, hydroquinone, 1,2,2- or 1,1,2-tris-(hydroxyphenyl)-ethane, ammonia, methyl amine, ethylenediamine, tetra- or hexamethylenediamine, triethanolamine, aniline, phenylenediamine, 2,4- and 2,6-diaminotoluene and polyphenyl polymethylene polyamines which can be obtained by condensing aniline with formaldehyde.

Polyether polyols modified by vinyl polymers are also suitable for use as the polymers $R^{11}$. Products such as these can be obtained, for example, by polymerizing styrene or acrylonitrile or a mixture thereof in the presence of polyethers.

The polyether polyols are functionalized in known manner. For example, conventional polyether polyols may be converted into the corresponding polyetheramines by reacting the terminal OH groups with ammonia or primary amines using methods known from the literature.

Corresponding polyether polyols are commercially obtainable in various compositions, for example under the name of JEFFAMIN®. Examples include the Jeffamin types D 230, D 400 and D 2000 based on difunctional polypropylene glycols, the types T 403, T 3000 and T 5000 based on trifunctional polypropylene glycols, the types ED 600, ED 900, ED 2001 and ED 6000 based on difunctional polyethylene glycols and the types M 300, M 600, M 1000 and M 2070 based on monofunctional polypropylene glycols.

Suitable aminofunctional polyethers may be converted by polymer-analog functionalization into polymers which contain a carbamate group as the functional group Z.

Polyacetals are also suitable for use as the polymers $R^{11}$. Polyacetals are understood to be compounds obtainable by reacting glycols, for example diethylene glycol or hexanediol, with formaldehyde. Polyacetals suitable for the purposes of the invention may also be obtained by polymerizing cyclic acetals. The foregoing observations in the description of the polyesters apply to the functionalization of the polyacetals with functional groups Z.

Polycarbonates are also suitable for use as the polymers $R^{11}$. Polycarbonates may be obtained, for example, by reacting the polyols mentioned above, more particularly diols, such as propylene glycol, butane-1,4-diol or hexane-1,6-diol, diethylene glycol, triethylene glycol or tetraethylene glycol or mixtures of two or more thereof, with diaryl carbonates, for example diphenyl carbonate or phosgene. The foregoing observations in the description of the polyesters apply to the functionalization of the polycarbonates with functional groups Z.

Polylactones are also suitable for use as the polymers $R^{11}$. Preferred polylactones are derived from compounds with the general formula HO—$(CH_2)_z$—COOH, where z is a number of 1 to about 20. Examples are ε-caprolactone, β-propiolactone, γ-butyrolactone or methyl-ε-caprolactone or mixtures of two or more thereof. The foregoing observations in the description of the polyesters apply to the functionalization of the polylactones with functional groups Z.

Polyethyleneimines are also suitable for use as the polymers $R^{11}$. Suitable polyethyleneimines can be obtained by polymerizing reaction of ethyleneimine and have a molecular weight of about 300 to about 100,000.

Polyamides are also suitable for use as the polymers $R^{11}$ in accordance with the invention. Suitable polyamides can be obtained, for example, by reaction of the above-mentioned dicarboxylic acids with corresponding diamines. Suitable diamines are, for example, those which have a molecular weight of about 32 to about 200 g/mol and which contain at least two primary, two secondary or one primary and one secondary amino group. Examples of such diamines are diaminoethane, diaminopropanes, diaminobutanes, diaminohexanes, piperazine, 2,5-dimethylpiperazine, amino-3-aminomethyl-3,5,5-trimethyl cyclohexane (isophorone diamine, IPDA), 4,4'-diaminodicyclohexylmethane, 1,4-diaminocyclohexane, aminoethyl ethanolamine, hydrazine, hydrazine hydrate or—optionally in small quantities—diamines, such as diethylenetriamine or 1,8-diamino-4-aminomethyl octane. Synthesis from lactams, such as ε-caprolactam, or aminocarboxylic acids, such as 11-aminoundecanoic acid, is also possible.

The molecular weights of the compounds of general formula VI usable in the process according to the invention is preferably in the range from about 300 to about 1,000,000. If a polymer is to be used as the compound of general formula VI, a polymer with a molecular weight of about 500 to about 300,000 and more particularly in the range from about 1,000 to about 30,000 is preferably used.

If a polyester to used as the compound corresponding to general formula VI, it preferably has a molecular weight of about 300 to about 100,000, for example in the range from about 500 to about 50,000 or in the range from about 1,000 to about 30,000.

If a polyether to used as the compound corresponding to general formula VI, it preferably has a molecular weight of about 300 to about 100,000, for example in the range from about 500 to about 50,000 or in the range from about 1,000 to about 30,000, for example in the range from about 3,000 to about 20,000 or in the range from about 4,000 to about 8,000 or about 12,000.

Suitable molecular weights for polycarbonates, polylactones, polyethyleneimines or polyamides usable as polymers corresponding to general formula VI in accordance with the invention are preferably in the range from about 300 to about 50,000 and more particularly in the range from about 1,000 to about 30,000.

In another embodiment of the present invention, the compounds corresponding to general formula VI may contain one or more silyl groups corresponding to general formula II besides the functional groups Z as functional groups.

According to the invention, the process according to the invention is carried out by reacting a compound containing at least one amino group with a carbamate, at least one of the reactants carrying a silyl group. Accordingly, another possible embodiment of the present invention is characterized, for example, by the reaction of two compounds corresponding to general formula III, of which one compound carries an amino group and the other a carbamate group, with one another. In another embodiment of the invention for example, one compound corresponding to general formula III is reacted with one compound corresponding to general formula VI or two compounds corresponding to general formula VI are reacted with one another, with the proviso that one of the reactants bears an amino group and the other reactant a carbamate group. Besides reacting two of the compounds mentioned, it is also possible in accordance with the invention to react three or more different compounds corresponding to general formula III or to general formula VI or mixtures of two or more different compounds corresponding to general formula III with one or more compounds corresponding to general formula VI or mixtures of two or more compounds corresponding to general formula VI with a compound corresponding to general formula III.

In a preferred embodiment of the invention, the reaction on which the process according to the invention is based takes place in the presence of a catalyst. Suitable catalysts are, for example, compounds corresponding to general formula VII:

$$M(OR^{12})_x \qquad (VII)$$

in which M is a metal selected from the group consisting of aluminium, titanium, magnesium or zirconium and $R^{12}$ stands for the same or different, linear or branched hydrocarbon radicals containing 1 to 8 carbon atoms and x has a value of 2, 3 or 4. Suitable catalysts are, for example, aluminium alkoxides, titanium alkoxides, magnesium alkoxides and zirconium alkoxides. Particularly suitable catalysts are, for example, aluminium trimethoxide, aluminium triethoxide, aluminium triisopropoxide, aluminium trisec.butoxide, aluminium tritert.butoxide, titanium(IV) methoxide, titanium(IV) ethoxide, titanium(IV) isopropoxide, titanium (IV) butoxide, titanium(IV) 2-ethylhexoxide, zirconium(IV) ethoxide, zirconium(IV) propoxide, zirconium(IV) butoxide, zirconium(IV) isopropoxide, zirconium(IV) tert.butoxide, magnesium methoxide, magnesium ethoxide, magnesium butoxide, magnesium propoxide or magnesium phenoxide.

Other suitable catalysts for the process according to the invention are tin compounds, more particularly organotin carboxylates, such as dibutyltin dilaurate, dibutyltin diacetate, dibutyltin bis-(2-ethylhexanoate) or other organotin compounds, such as dibutyltin oxide, dibutyltin dimethoxide, dibutyltin dibromide, dibutyltin dichloride, ditert.butyltin dichloride, dimethyltin dibromide, dimethyltin dichloride, diphenyltin dichloride or tin octoate. Of the catalysts mentioned, dibutyltin dilaurate, dibutyltin oxide and dibutyltin diacetate are preferred.

Other suitable catalysts are compounds which contain at least one metal selected from the group consisting of antimony, iron, cobalt, nickel, copper, chromium, maganese, molybdenum, tungsten or lead. The oxides, halides, carboxylates, phosphates or organometallic compounds of the metals mentioned are particularly suitable. Examples of particularly suitable catalysts include iron acetate, iron benzoate, iron naphthenates; iron acetyl acetonates, manganese acetate, manganese naphthenate and manganese acetyl acetonate.

The quantity of catalyst used in the process according to the invention is in the range from about 0.01 to about 0.5% by weight and more particularly in the range from about 0.05 to about 0.2% by weight.

The process according to the invention is preferably carried out at a pH of about 2 to about 12 and more particularly at a pH of about 5 to about 9, for example at a pH of about 5.5 to about 8.5.

The process according to the invention may be carried out in the absence of solvents or in an organic solvent. Suitable organic solvents have a boiling point of at least about 100° C. and preferably higher. Suitable solvents are, for example, dioctyl phthalate, didecyl phthalate, didoceyl phthalate and other homologous esters of polybasic carboxylic acids. Other suitable organic solvents are phosphoric acid esters, for example chlorinated phosphoric acid esters, and also dibenzyltoluene, triphenylmethane, phenylnaphthalene, biphenyl, diethylbiphenyl or triethylbiphenyl. Basically, any solvents with a sufficiently high boiling point may be used providing they are inert to the reactants.

In a preferred embodiment of the invention, the solvent is a solvent which is used in a subsequent formulation involving the compounds according to the invention, for example as plasticizers, and which may therefore remain in the prepolymer.

The reaction is preferably carried out at a temperature of about 50 to about 300° C. and more particularly as a temperature of about 50 to about 250° C. Suitable reaction temperatures are, in particular, in the range from about 80 to about 220° C. or up to about 190° C.

The reaction time is between about 0.1 and about 10 hours, depending on the temperature and the catalyst(s) used. In a preferred embodiment of the invention, the reaction conditions are selected so that the reaction time is between about 0.5 and about 1.5 hours. The progress of the reaction may be followed, for example, by monitoring the amine value in the reaction mixture. The reaction is preferably continued until the amine value has fallen to a value of about 5 or less, for example to a value of 1 or less, more particularly to a value of 0.5 or less.

On completion of the reaction, i.e. after the required amine value has been reached, the reaction mixture is cooled. Depending on the required conduct of the reaction, the pressure may be reduced during cooling, for example, so that any readily volatile constituents, such as low molecular weight alcohols or any solvent used, are removed in vacuo.

The above-mentioned reactants may be used in various molar ratios in the process according to the invention. Basically, any ratios of amino groups to carbamate groups may be used. In a preferred embodiment, however, the ratio of amino groups to carbamate groups is selected so that it is at most about 1:1. This ensures that substantially every amino group reacts with a carbamate group.

Another embodiment of the present invention is characterized by a conduct of the reaction in which the reactant carrying the carbamate groups has at least two carbamate groups. In this case, another embodiment of the invention is characterized in that the ratio of carbamate groups to amino groups is 1 or less than 1, for example about 0.1 to about 0.99 or about 0.3 to about 0.9 or about 0.4 to about 0.8.

Basically, suitable reactants containing at least two carbamate groups are any reactants carrying at least two carbamate groups which correspond to general formula VI. Suitable compounds may be produced, for example, from the above-described compounds carrying at least two amino groups in the manner already described.

In a preferred embodiment of the present invention, however, a polymer is used as the reactant containing at least two carbamate groups.

Suitable polymers containing at least two carbamate groups can be produced from the polymers containing at least two amino groups already described in the foregoing in the manner already described.

In a preferred embodiment of the present invention, a polymer containing at least one ether group is used as the polymer containing at least two carbamate groups. In another preferred embodiment of the present invention, a polyether or a polyamide or a polyurea or a mixture of two or more thereof is used as the polymer containing at least two carbamate groups.

According to the invention, a compound containing an amino group or a compound containing two or more amino groups is used as reactant for the compound containing at least two carbamate groups or the mixture of two or more such compounds. In a preferred embodiment, however, a compound containing only one amino group is used.

According to the invention, at least the reactant containing the amino group(s) preferably contains one or more silyl groups. In a preferred embodiment of the invention, a polymer containing at least two carbamate groups or a mixture of two or more such polymers and an aminosilane or a mixture of two or more aminosilanes are used as reactants.

If the reaction according to the invention between a compound containing at least two carbamate groups or a mixture of two or more thereof and a compound containing one or more amino groups is carried out in such a way that the ratio of amino groups to carbamate groups is <1, the process according to the invention is preferably carried out in the presence of a trimerization catalyst. In the reaction on which the process according to the invention is based, isocyanurate groups are formed in the presence of a trimerization catalyst.

According to the invention, the reaction according to the invention (cracking/trimerization reaction) may be carried out, for example, until the reaction mixture no longer contains carbamate groups. In another embodiment of the present invention, however, the reaction is incomplete. In the context of the invention, an "incomplete reaction" is understood to be a reaction in which not all the carbamate groups present in the reaction mixture are reacted, i.e. in which carbamate groups remain in the reaction product. Basically, this variant of the process according to the invention is suitable for any combinations of reactants where at least one reactant carries at least one carbamate group. However, this variant is particularly advantageous when one of the reactants contains at least two carbamate groups.

Accordingly, the present invention also relates to a polymer which contains at least one urea group, at least one alkoxysilyl group and at least one carbamate group. In another embodiment of the present invention, this polymer may additionally contain, for example, one or more isocyanurate groups.

The reaction may readily be terminated by methods known to the expert, for example by the addition of a catalyst poison or by lowering the temperature.

The effect of the remaining carbamate groups is that the reaction product has a lower viscosity than the fully reacted product and hence simplifies use as a binder for adhesives and sealants. In addition, the remaining carbamate groups may additionally be used for formulating heat-activatable adhesives and sealants because the carbamate groups split at temperatures above 150° C. to give the isocyanate and can be further crosslinked by trimerization or allophanatization.

Trimerization catalysts are known to the expert from the relevant literature (see, for example, Laas et al., J. prakt. Chem. 336 (1994), pages 192 to 196 and various patent publications, such as U.S. Pat. No. 5,218,133 (Union Carbide), U.S. Pat. No. 4,412,073 (Rhone-Poulenc), U.S. Pat. No. 5,260,436 (Iowa), U.S. Pat. No. 5,837,796 (Bayer) and U.S. Pat. No. 4,124,545 (Bayer)). Suitable trimerization catalysts are, for example, the catalysts already described in the foregoing in connection with the reaction of carbamate groups and amino groups. Other suitable trimerization catalysts are the alkali metal salts of organic acids or alkali metal salts of phosphoric acid and also amines which do not react with the carbamate groups. Examples of alkali metal salts of organic acids include the sodium, potassium, lithium or caesium salts of acetic acid, propionic acid, butyric acid, hexanoic acid, oleic acid, maleic acid, fumaric acid, succinic acid and the like. Examples of alkali metal salts of phosphoric acid include, for example, alkali metal orthophosphates, such as trisodium orthophosphate, tripotassium orthophosphate or dipotassium orthophosphates, such as disodium orthophosphate or dipotassium orthophosphate. Amines suitable as trimerization catalysts are, for example, tertiary amines, such as N,N-dimethyl dodecylamine, 1,4-diazabicyclo-[2.2.2]-octane (DABCO). Mixtures of two or more of the compounds mentioned are also suitable.

In a preferred embodiment of the present invention, either an organotin compound, more particularly dibutyltin dilaurate, aluminium triisopropylate, iron(II) acetyl acetonate or a mixture of the catalysts mentioned is used as the trimerization catalyst. Catalysts which simultaneously catalyze cracking and trimerization, for example aluminium triisopropylate, are particularly preferred.

It is possible by the process according to the invention to produce polymers which, in contrast to polymers containing isocyanurate structures, contain only one isocyanurate group and three urea groups and three silyl groups or, if the ratio of carbamate groups to amino groups is selected accordingly, several triisocyanurate groups and a corresponding number of urea groups and silyl groups. However, in the case of those polymers which contain more than one isocyanurate group, no other structural element obtainable by reaction of isocyanate groups with an isocyanate-reactive compound is present between two isocyanurate groups.

Accordingly, the present invention also relates to a polymer which contains at least one isocyanurate structural element and at least one alkoxysilyl group. If the polymer contains more than one isocyanurate structural element, no structural element which can be formed by reaction of an isocyanate group with an isocyanate-reactive functional group is present between at least two isocyanurate structural elements in the polymer or the structure lying between two isocyanurate groups has a molecular weight of at least 300.

In the context of the present invention, a "structure lying between two isocyanurate groups" is understood to be a chain of covalently bonded atoms. The polymers according to the invention contain either only one isocyanurate structural element, at least one urea group and at least one alkoxysilyl group or more than one isocyanurate structural element, at least one urea group and at least one alkoxysilyl group. If a polymer according to the invention contains more than one isocyanurate structural element, it has to satisfy various requirements. Either no structural element obtainable by reaction of an isocyanate group with an isocyanate-reactive functional group is present between at least two isocyanaurate structural elements in the polymer, i.e. no urethane group, urea group or oxazolidone group is present between at least two isocyanurate groups.

Corresponding polymers according to the invention can be obtained, for example, when compounds containing at least two carbamate groups which have no structural elements obtainable by the reaction of an isocyanate group with an isocyanate-reactive compound in the substituent $R^{11}$ are used as the compounds corresponding to general formula VI. Substantially all the polymers already mentioned in the foregoing are suitable.

The term "molecular weight" as used in the present specification applies to the molecular weight determined by GPC under conditions typical of the particular polymer, based on polystyrene as standard.

The polymers according to the invention may be produced by reaction of a prepolymer containing at least two carbamate groups or a mixture of two or more such prepolymers with an alkoxysilane containing at least one amino group, the molar ratio of carbamate group to amino groups being less than 1.

Accordingly, the present invention also relates to a polymer obtainable by reaction of a prepolymer containing at least two carbamate groups or a mixture of two or more such prepolymers with an alkoxysilane containing at least one amino group, the molar ratio of carbamate groups to amino groups being less than 1.

A "prepolymer" in the context of the invention is understood to be a compound corresponding to general formula VI which contains at least two functional groups Z, at least two of the functional groups Z being a carbamate group. A prepolymer according to the invention has a molecular weight of at least about 150 and at most about 1,000,000 and preferably in the range from at least about 500 to about 50,000, for example in the range from about 1,000 to 50,000.

The compounds produced by the process according to the invention and the polymers according to the invention are suitable, for example, for use in surface coating compositions, such as paints or similar coating systems, and for use in adhesives, sealants and foams.

Accordingly, the present invention also relates to the use of a compound produced by the process according to the invention or of a polymer according to the invention for the production of surface coating compositions, sealants, adhesives, for example pressure-sensitive adhesives or hotmelt adhesives, assembly or insulating foams.

The present invention also relates to a surface coating composition or an adhesive at least containing a polymer produced by a process according to the invention or a polymer according to the invention.

In a preferred embodiment of the invention, surface coating compositions or adhesives contain a crosslinking catalyst which catalyzes the crosslinking of the silyl groups or a mixture of two or more such catalysts.

Suitable crosslinking catalysts are, for example, amino compounds, such as triethylenediamine, trimethylaminoethyl piperazine, pentamethyl diethylenetriamine, tetramethyl iminoisopropylamine or bis-(dimethylaminopropyl)-N-isopropanolamine or dimorpholinodiethyl ether. Other suitable catalysts are those based on organic or inorganic heavy metal compounds, such as cobalt naphthenate, dibutyl tin dilaurate, tin mercaptides, tin dichloride, zirconium tetraoctoate, antimony dioctoate, lead dioctoate, metal—more particularly iron—acetyl acetonate. Any of the known catalysts for accelerating the condensation of silanols are particularly suitable. Examples of such catalysts include organotin, organotitanium, organozirconium- or organoaluminium compounds. Examples of such compounds are dibutyltin dilaurate, dibutyltin dimaleate, tin octoate, isopropyl triisostearoyl titanate, isopropyltris-(dioctylpyrophosphate)-titanate, bis-(dioctylpyrophosphate)-oxyacetate titanate, tetrabutyl zirconate, tetrakis-(acetylacetonato)-zirconium, tetraisobutyl zirconate, butoxytris-(acetylacetonato)-zirconium, tris-(ethylacetoacetato)-aluminium. Dibutyltin alkylesters, such as dibutyltin alkylmaleates or dialkyltin laurates, are particularly suitable, more particularly dibutyltin bis-ethylmaleate, dibutyltin bis-butylmaleate, dibutyltin bis-octylmaleate, dibutyltin bis-oleylmaleate, dibutyltin bis-acetylacetate, dibutyltin diacetate, dibutyltin dioctoate, dibutyltin oxide, dibutyltin bistriethoxy silicate and catalytically active derivatives thereof. The catalysts mentioned may be used individually or in the form of a mixture of two or more.

A crosslinking catalyst may be used, for example, in a quantity of 0.01% to about 2% and preferably in a quantity of 0.05% to about 0.5%, based on the weight of the silyl groups.

In another embodiment of the present invention, a surface coating composition according to the invention or an adhesive according to the invention may contain further additives. Suitable additives are, for example, tackifiers, plasticizers, rheological additives, antioxidants, UV stabilizers, dyes, pigments, adhesion promoters, drying agents, flame retardants, cell regulators, propellent gases or fillers.

The storage stability of the compounds according to the invention or the compositions produced from them can be increased, for example, by reactive silanes. Suitable reactive silanes are, for example, tetramethoxysilane, trimethoxy methyl silane or trimethoxy vinyl silane which are suitable for trapping water. The content of such compounds should not exceed 3% by weight, based on the mixture as a whole containing the reactive silane or the mixture of two or more reactive silanes.

Suitable flame retardants are, for example, any of the usual phosphorus-containing compounds, more particularly elemental phosphorus, phosphates or phosphonates, for example triethyl phosphate or trichloropropyl phosphate. Compounds such as these can have both plasticizing and viscosity-adjusting properties. Other suitable flame retardants are, for example, diphenylcresyl phosphates, triphenyl phosphate, dimethylmethane phosphonate and the like. In addition, chloroparaffins may also be used as flame retardants. Also suitable are halogenated polyester or polyether polyols, for example commercially available brominated polyether poylol. Halogenated polyester or polyether polyols may be incorporated, for example, in the polymers according to the invention.

If the compounds according to the invention, particularly the polymers according to the invention, are present in compositions suitable for the production of foams, these compositions may contain, for example, cell regulators or propellents or both. The cell regulators used are normally silicone-based compounds. In a preferred embodiment of the present invention, liquid, crosslinkable polybutadiene, silicone oils or paraffin oils are used as the cell regulator. In a preferred embodiment of the invention, commercially available silicone stabilizers are used as the stabilizers.

If the compounds according to the invention are to be used for the production of foams, they are preferably supplied to the user in pressurized containers (aerosol cans). A composition containing a compound according to the invention additionally contains at least one propellent for dispensing the binders or binder compositions according to the invention from the aerosol cans. Suitable propellents are, for example, low-boiling fluorocarbons, hydrocarbons or ethers or mixtures of two or more thereof. The fluorocarbons R124, R125, R134a, R142b, R143 and R152a, R227, the pure hydrocarbons propane, butane and isobutane and dimethyl ether either individually or in the form of mixture of two or more thereof are particularly preferred. In addition, $CO_2$, $N_2O$ or $N_2$ may be present as propellents. Any combinations of these gases are possible. For aerosol can formulations, propellent gas contents of 5 to 40% by weight and more particularly 5 to 20% by weight, based on the composition as a whole, are preferred. The content of gases non-condensible under the prevailing pressure conditions should be gauged so that the volume based on the empty space of the pressurized container gives a pressure of about 8 to 10 bar, depending on the relevant national regulations for aerosol cans and pressurized containers (where such regulations exist). Since no $CO_2$ is given off during the crosslinking of the compounds according to the invention, sufficient propellent gas must be present both for dispensing and for foaming.

The tackifiers used are, for example, hydrocarbon resins, more particularly C5 or C9 resins or C5-resin-modified C9 resins. Other suitable tackifiers are resins based on pure hydrocarbon monomers, for example resins obtainable from the polymerization of mixtures of styrene, α-methyl styrene and vinyl toluene. The hydrocarbon resins mentioned may be partly hydrogenated or fully hydrogenated.

Also suitable for use as tackifiers are natural resins, such as gum rosin obtainable, for example, from trees and liquid rosin which is obtained, for example, in papermaking. The natural resins may be used in the above-mentioned form as tackifiers although they may also be used after esterification with corresponding polyhydric alcohols as pentaerythritol esters, glycerol esters, diethylene glycol esters, triethylene glycol esters or methyl esters.

Polyterpene resins are also suitable tackifiers. Terpenes are obtained in the separation of oleoresin acids from their natural solvents and can be polymerized to polyterpene resins. Also suitable for use as tackifiers are the terpene/phenol resins obtainable from polyterpene resins by phenol modification.

In addition, the adhesive according to the invention may contain stabilizers or antioxidants as additives. These generally include the phenols, the sterically hindered high molecular weight phenols, polyhydric phenols, sulfur- and phosphorus-containing phenols or amines. Suitable stabilizers are, for example, hydroquinone, hydroquinone methylether, 2,3 -(ditert.butyl)-hydroquinone, 1,3,5-trimethyl-2,4,6-tris(3,5-ditert.butyl-4-hydroxybenzyl)-benzene; pentaerythritol tetrakis-3-(3,5-ditert-butyl-4-hydroxyphenyl)-propionate; n-octadecyl-3,5-ditert-butyl-4-hydroxyphenyl)-propionate; 4,4-methylene-bis-(2,6-ditert.butylphenol); 4,4-thiobis-(6-tert.butyl-o-cresol); 2,6-ditert.butylphenol; 6-(4-hydroxyphenoxy)-2,4-bis-(n-octylthio)-1,3,5-triazine; di-n-octadecyl-3,5-ditert.butyl-4-hydroxybenzyl phosphonates; 2-(n-octylthio)-ethyl-3,5-ditert.butyl-4-hydroxybenzoate; and sorbitol hexa-[3-(3,5-ditert.butyl-4-hydroxyphenyl)-propionate]; and p-hydroxydiphenylamine or N,N'-diphenylenediamine or phenothiazine.

The surface coating composition according to the invention or the adhesive according to the invention may additionally contain plasticizers, such as benzoate plasticizers, phosphate plasticizers, liquid resin derivatives or vegetable and animal oils. Suitable plasticizers are, for example, sucrose benzoate, diethylene glycol dibenzoate and/or diethylene glycol benzoate where about 50 to about 95% of all hydroxyl groups have been esterified, phosphate plasticizers, for example t-butylphenyl diphenyl phosphate, polyethylene glycols and derivatives thereof, for example diphenyl ethers of poly(ethylene glycol), liquid resin derivatives, for example the methyl ester of hydrogenated resin, vegetable and animal oils, for example glycerol esters of fatty acids and polymerization products thereof.

Plasticizers based on phthalic acid, particularly the alkyl phthalates, are also suitable.

The surface coating composition according to the invention or the adhesive according to the invention may additionally contain dyes, such as titanium dioxide, fillers, such as gypsum, talcum, clay and the like, and pigments.

The additives may be present individually or in the form of a mixture of two or more of the substances mentioned. The quantity in which the additives are present should not exceed about 20% by weight (based on the surface coating composition as a whole or the adhesive as a whole). Suitable quantities are, for example, about 0.1 to about 15% by weight or about 1 to about 10% by weight, In a preferred embodiment of the invention, the additives are used in quantities of, for example, about 2, 3, 4, 5, 7 or 9% by weight.

Suitable surface coating compositions or adhesives have, for example, the following approximate composition:

Basic formulations:

Foams:

40–80% by weight prepolymer

10–25% by weight plasticizer or flame retardant

0–5% by weight foam stabilizer

0–2% by weight catalyst(s)

0–5% by weight other additives

10–25% by weight propellent gas

1. Sealant and Assembly Adhesive

25–50% by weight prepolymer

25–50% by weight filler(s)

0–25% by weight additives

>1% by weight catalyst(s)

The invention is illustrated by the following Examples.

EXAMPLES

Example 1

51.7 g octylamine, 94.8 g methyl-N-(trimethoxysilylpropyl)-methyl carbamate and 0.1 g dibutyltin dilaurate were heated under nitrogen to 180° C. After 3 h, the amine value had fallen from 153 to <10. After cooling to room temperature, a white solid was obtained.

Example 2

Silylation of Jeffamin T5000 with methyl-N-(trimethoxysilylpropyl)-carbamate 385.0 g Jeffamin T5000 (propoxylated glycerol with terminal amino groups, molecular weight ca. 5,000, amine value: 27.5) were weighed into a 1-liter three-necked flask and dried at ca. 100° C. under a pressure of 20 mbar. After purging with nitrogen, 57.1 g N-(trimethoxysilylpropyl)-methylcarbamate and 0.1 g dibutyltin dilaurate were added and the whole was heated under nitrogen to 190° C. Within an hour, the amine value had fallen to 2.5. After cooling to room temperature, a clear liquid with a viscosity of ca. 100 Pas (Brookfield RVT, spindle 6, 5 r.p.m.) was obtained.

0.2% dibutyl tin diacetonate was added to the liquid which was then introduced into a rectangular mold in a layer thickness of 2 mm and stored for 1 week at 50% relative humidity/23° C. for complete hardening.

A colorless, flexible and elastic polymer film was obtained after full curing.

Comparison Example 1

Silylation of Jeffamin D4000 with 3-isocyanatopropyl trimethoxysilane 106 g 3-isocyanatopropyl trimethoxysilane were added dropwise over a period of 20 mins. to 1,000 g Jeffamin D4000 (α,ω-aminopolypropylene glycol, molecular weight ca. 4,000, amine value: 28); increase in temperature ca. 15° C. 1 hour after the end of the addition of the isocyanatosilane, no more isocyanate could be detected. A clear colorless liquid with a viscosity of 5,000 mPas was obtained.

0.2% dibutyl tin dilaurate was added to the liquid which was then introduced into a rectangular mold in a layer thickness of 2 mm and stored for 1 week at 50% relative humidity/23° C. for complete hardening.

24 hours after application, the surface of the cured film (catalyst 0.1% by weight dibutyltin bis-(2,4-pentanedionate)) was slightly tacky.

Example 3

Silylation of Jeffamin D4000 with methyl-N-(trimethoxysilylpropyl)-carbamate 200.0 g Jeffamin D4000 were weighed into a 0.5 liter three-necked flask and dried at ca. 100° C./20 mbar. After purging with nitrogen, 25.6 g N-(trimethoxysilylpropyl)-methylcarbamate and 0.1 g dibutyltin dilaurate were added and the whole was heated under nitrogen to 180° C. Within an hour, the amine value had fallen to 0.5. After cooling to <150° C., the mixture was slowly cooled in vacuo (ca. 20 mbar) to room temperature. A clear yellow liquid with a viscosity of 9,000 mPas (Brookfield RVT, spindle 6, 20 r.p.m.) was obtained.

24 hours after application, the cured film (catalyst 0.1% by weight dibutyltin-bis-(2,4-pentanedionate)) was flexible, elastic and tack-free.

Example 4

Silylation of a polyamide with methyl-N-(trimethoxysilylpropyl)-carbamate 150.0 g Macromelt TPX 22-405 (polyamide with terminal amino groups) were melted under nitrogen and 0.15 g dibutyltin dilaurate and 4.4 g N-(trimethoxysilylpropyl)-methylcarbamate were stirred into the melt. The mixture was then heated for ca. 2 h to 180–190° C. After cooling to <150° C., the mixture was slowly cooled in vacuo (ca. 20 mbar) to room temperature.

A transparent yellow solid was obtained.

Comparison Example 2

Silylation of a polyamide of dimer fatty acid and ethyl nediamine with 3-isocyanatopropyl trimethoxysilane 24.5 g 3-isocyanatopropyl trimethoxysilane were added dropwise with stirring to 100 g of the polyamide at 80° C. (temperature increase ca. 20° C.). One hour after the end of the addition of the isocyanatosilane, no more isocyanate could be detected. A yellow-brown, slightly cloudy wax-like substance which melted at 70±5° C. was obtained. The cured, clear yellow film (catalyst 0.15% by weight dibutyltin-bis-(2,4-pentanedionate)) is hard and inelastic.

Example 5

Silylation of a polyamide of dimer fatty acid and ethylenediamine with methyl-N-(trimethoxysilylpropyl)-carbamate 21.0 g methyl-N-(trimethoxysilylpropyl)-carbamate and 0.15 g dibutyltin dilaurate were stirred into 100 g of the polyamide at 100° C. and the resulting mixture was stirred for 1 h at 180° C. It was then slowly cooled in vacuo (ca. 20 mbar) to room temperature. A yellow-brown, slightly cloudy wax-like substance which melted at 70±5° C. was obtained. The cured, clear yellow film (catalyst 0.15% by weight dibutyltin-bis-(2,4-pentanedionate)) had the same properties as in Comparison Example 2.

Example 6

Reaction of Jeffamin D 2000 to polyoxypropylene dicarbamate and subsequent pyrolysis in the presence of 3-aminopropyl trimethoxysilane 2 g of a 30% methanolic sodium methylate solution were stirred dropwise into 100 g water-free dimethyl carbonate, after which 250 g Jeffamin D 2000 were added dropwise with stirring over a period of 30 minutes. The reaction to the carbamate took place over a period of 5 hours at 75° C. and produced a yield of >90%. The sodium methylate was then neutralized with 0.6 g acetic acid, the salt was filtered off and the solvent distilled off.

The purified dicarbamate was then mixed with 44.8 g 3-aminopropyl trimethoxysilane and 0.3 g dibutyltin dilaurate and the resulting mixture was reacted at 180–190° C. as in Example 3 to form a silylated prepolymer.

Example 7

Pyrolysis of 1,6-(di-N-methylcarbamato)-hexane in the presence of bis-(trimethoxysilylpropyl)-amine 100 g 1,6-(di-N-methylcarbamato)-hexane, 73.2 g bis-(trimethoxysilylpropyl)-amine and 0.17 g dibutyltin dilaurate were weighed into a 0.25 liter three-necked flask and the mixture was heated with vigorous stirring under nitrogen to 190° C. After 30 mins., a vacuum (300 mbar) was applied. After another 30 mins., the vacuum was reduced to about 20 mbar and the mixture was slowly cooled to room temperature.

A yellow-brown, soft resin was obtained.

The invention claimed is:

1. A process for the production of compounds containing at least one isocyanurate group, at least one urea group and at least one silyl group comprising reacting a compound containing at least one amino group and a carbamate compound together as reactants, wherein at least one of the reactants carries a silyl group.

2. The process of claim 1 wherein the reaction is carried out in the presence of a catalyst.

3. The process of claim 1 wherein the reactants further comprise at least one of methyl carbamate or ethyl carbamate.

4. The process of claim 2 wherein the catalyst is selected from the group consisting of organic bases and organometallic compounds.

5. The process of claim 1 wherein at least one polymer is used as the at least one reactant.

6. The process of claim 5 wherein the polymer is selected from the group consisting of polyacrylates, polymethacrylates, polystyrenes, polyesters, polyethers, polyamides, polyurethanes, polycarbonates, polylactones, polyethylene imine, polyureas, polyolefins and polyoxazolidones.

7. The process of claim 1 wherein the at least one reactant contains at least two carbamate groups.

8. The process of claim 7 wherein the reactant containing at least two carbamate groups is a polymer.

9. The process of claim 7 wherein the reaction is carried out in the presence of a trimerization catalyst.

10. The process of claim 1 wherein not all of the carbamate groups are reacted.

11. The process of claim 1 wherein at least one compound containing a silyl group, a urea group and a carbamate group is present after the reaction.

12. A method for the production of surface coating compositions, sealants, adhesives or assembly or insulating foams comprising addition of a compound produced by the method of claim 1 to a surface coating composition, a sealant, and adhesive or assembly, or an insulating foam.

* * * * *